(12) United States Patent
Bech et al.

(10) Patent No.: US 11,506,182 B2
(45) Date of Patent: Nov. 22, 2022

(54) WIND TURBINE BLADE ASSEMBLY

(71) Applicant: Vestas Wind Systems A/S, Aarhus N. (DK)

(72) Inventors: Anton Bech, Ciudad Real (ES); Lasse Lykkegaard, Herning (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/049,408

(22) PCT Filed: Apr. 17, 2019

(86) PCT No.: PCT/DK2019/050122
§ 371 (c)(1),
(2) Date: Oct. 21, 2020

(87) PCT Pub. No.: WO2019/206386
PCT Pub. Date: Oct. 31, 2019

(65) Prior Publication Data
US 2021/0239101 A1 Aug. 5, 2021

(30) Foreign Application Priority Data
Apr. 23, 2018 (DK) .......................... PA 2018 70241

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2230/60* (2013.01);
(Continued)

(58) Field of Classification Search
CPC .... F03D 1/0675; F03D 80/30; F05B 2230/60; F05B 2240/302; F05B 2240/85; F05B 2260/301; F05B 2280/6003
See application file for complete search history.

(56) References Cited

U.S. PATENT DOCUMENTS 7,922,454 B1 * 4/2011 Riddell .................. F03D 80/30
416/224
8,562,296 B2 * 10/2013 Arocena De La Rua ..................
F03D 80/30
416/146 R
(Continued)

FOREIGN PATENT DOCUMENTS

EP 1561947 A2 8/2005
EP 1584817 A1 10/2005
(Continued)

OTHER PUBLICATIONS

Danish Patent and Trademark Office, Search and Examination Report in PA 2018 70241, dated Oct. 22, 2018.
(Continued)

*Primary Examiner* — Courtney D Heinle
*Assistant Examiner* — Sang K Kim
(74) *Attorney, Agent, or Firm* — Wood Herron & Evans LLP

(57) ABSTRACT

A wind turbine blade assembly comprising: a first wind turbine blade portion having a first attachment portion and a first metallic plate, a second wind turbine blade portion having a second attachment portion and a second metallic plate, and at least one tension member for coupling to the first and second attachment portions to join the first wind turbine blade portion to the second wind turbine blade portion, wherein the first and second metallic plates are configured to abut in compression due to tension in the tension member when the first wind turbine blade portion is joined to the second wind turbine blade portion with the at least one tension member. Also, a method of joining blade portions to construct a blade.

20 Claims, 6 Drawing Sheets

(52) U.S. Cl.
CPC ..... *F05B 2240/302* (2013.01); *F05B 2240/85* (2020.08); *F05B 2260/301* (2013.01); *F05B 2280/6003* (2013.01)

(56) References Cited

U.S. PATENT DOCUMENTS

| | | | | |
|---|---|---|---|---|
| 11,015,573 | B2* | 5/2021 | Bech | F03D 1/0675 |
| 2003/0138290 | A1* | 7/2003 | Wobben | F03D 80/00 |
| | | | | 403/293 |
| 2010/0122442 | A1* | 5/2010 | Kirkpatrick | B23P 15/04 |
| | | | | 29/233 |
| 2010/0329865 | A1* | 12/2010 | Hibbard | F03D 80/30 |
| | | | | 416/146 R |
| 2014/0178205 | A1* | 6/2014 | Nanukuttan | B23P 11/00 |
| | | | | 416/241 R |
| 2017/0122287 | A1* | 5/2017 | Dobbe | F03D 1/0675 |

FOREIGN PATENT DOCUMENTS

| | | |
|---|---|---|
| EP | 2199604 A2 | 6/2010 |
| EP | 2243955 A2 | 10/2010 |
| JP | 2008115783 A | 5/2008 |
| WO | 2011070137 A1 | 6/2011 |
| WO | 2018121826 A1 | 7/2018 |

OTHER PUBLICATIONS

European Patent Office, International Search Report and Written Opinion in PCT/DK2019/050122, dated Jul. 12, 2019.

* cited by examiner

WIND TURBINE BLADE ASSEMBLY

FIELD OF THE INVENTION

The invention relates to a wind turbine blade assembly, and a method of constructing a wind turbine blade.

BACKGROUND OF THE INVENTION

It is known to construct wind turbine blades using separable spanwise blade portions, which are joined together in order to facilitate transport of large wind turbine blades. For example, applicant's co-pending PCT application no. PCT/DK2017/050441, which is incorporated herein by reference, describes such a 'split blade' for a wind turbine. However, connections between adjacent blade portions can be complex which can add time and cost to construction.

SUMMARY OF THE INVENTION

According to a first aspect of the invention, there is provided a wind turbine blade assembly comprising: a first wind turbine blade portion having a first attachment portion and a first metallic plate, a second wind turbine blade portion having a second attachment portion and a second metallic plate, and at least one tension member for coupling to the first and second attachment portions to join the first wind turbine blade portion to the second wind turbine blade portion, wherein the first and second metallic plates are configured to abut in compression due to tension in the tension member when the first wind turbine blade portion is joined to the second wind turbine blade portion with the at least one tension member.

A further aspect of the invention provides a method of constructing a wind turbine blade comprising: providing a first blade portion having a first attachment portion and a first metallic plate, providing a second blade portion having a second attachment portion and a second metallic plate, and joining the first and second attachment portions via a tension member, such that the first and second metallic plates abut in compression due to tension in the tension member.

The invention is advantageous in that abutting metallic plates mean the wind turbine blade can have better wear resistance at the joint between the wind turbine blade portions and/or can facilitate easy connection of a lightning strike protection system or equipotential bonding of conductive components in the blade.

In an example, the tension member is arranged to cross the first and second metallic plates when the wind turbine blade is viewed in planform, when the first wind turbine blade portion is joined to the second wind turbine blade portion.

In an example, the first and second attachment portions are arranged to be coupled by at least two tension members, and the first and second metallic plates are arranged between the at least two tension members.

The metallic plates can be held together such that flexing of the wind turbine blade does not cause separation of the plates and so electrical conductivity between the plates is made more reliable, and a more uniform compressive load may be applied to the plates so reducing wear on the plates.

In an example, a first tension member is arranged above the metallic plates and a second tension member is arranged below the metallic plates.

In an example, the first tension member and second tension member are arranged spaced apart in a chordwise direction when viewed in planform.

In an example, the first and second blade portions each comprise a first and second component of a lightning protection system respectively, and the first and second components are electrically coupled to the first and second metallic plates respectively.

With such an arrangement, the metallic plates form a connection between two separate parts of the lightning protection system, providing a simple and reliable connection.

In an example, the first and second components each comprise at least one of a metallic mesh on the outer surface of the blade portion, and an electrically conductive cable extending through the blade portion.

While the term "cable" is used here, it will be understood by a skilled person that the term is intended to include other electrical coupling means, such as ribbons or braids.

The word "cable" is not intended to limit to a conventional round cable having a circular cross-section.

In an example, the wind turbine blade portions comprise an electrically conductive carbon fibre spar extending through the blade portion.

In an example, the first and second components are separate components and are electrically coupleable via the first and second metallic plates. In other words, the first and second components are not continuous across the joint between the wind turbine blade portions.

In an example, the first and second metallic plates form a primary current path between the blade tip and the blade root, such that when a lightning strike occurs, for example, at the blade tip and electrical current flows through the blade, the majority of the charge will pass through the metallic plates.

In an example, one of the metallic plates is equipotentially bonded to any other metallic component of a joint between the first and second blade portions.

In an example, the attachment portions each comprise at least one aperture extending through the attachment portion in a thickness direction of the wind turbine blade.

In an example, there is at least one connection member disposed in the aperture, the connection member being arranged for coupling to one of the tension members.

In an example, the first and second metallic plates each have a substantially planar abutment surface.

In an example, the first metallic plate has at least one pin extending in a spanwise direction of the first blade portion and the second metallic plate has at least one corresponding hole for receiving the pin.

With such an arrangement, the metallic plates may be more easily and more reliably aligned.

In an example, the first and second blade portions further comprise a plurality of first and second attachment portions respectively, and the first attachment portions are spaced apart in a chordwise direction and the second attachment portions are spaced apart in the chordwise direction.

In an example, the first and second blade portions each comprise a shell, the shell formed of a top side forming a suction surface of the blade and a bottom side forming a pressure surface of the blade, the top and bottom sides each comprising first and second attachment portions, first and second metallic plates and at least one tension member.

In an example, the method further comprises connecting a discharge cable between the first and second metallic plates before the joining step, and disconnecting the discharge cable after the metallic plates are brought to abutment by the joining step.

With such an arrangement, a person joining the two wind turbine blade portions may be protected from a static build up which may occur on the metallic plates.

While the term "discharge cable" is used, this is intended to cover any means of (temporarily) electrically coupling the plates before they are brought into abutment.

In an example, the method further comprises electrically coupling at least one of the metallic plates to a component of a lightning protection system.

In an example, the component comprises at least one of a metallic mesh on the outer surface of the blade portion, and an electrically conductive cable extending through the blade portion.

In an example, the first and/or second blade portions comprise an electrically conductive carbon fibre spar extending through the blade portion, and the method may further comprise electrically coupling the electrically conductive carbon fibre spar to at least one of the metallic plates.

In an example, the electrical coupling is performed before the joining of the first and second attachment portions.

With such an arrangement, most if not all of the electrical coupling within each blade portion can be performed during manufacture of the blade portions such that the onsite joining of the blade portions to form the complete blade is made simpler.

In an example, the method further comprises equipotentially bonding one of the metallic plates to any other metallic component of a joint between the first and second blade portions.

BRIEF DESCRIPTION OF THE DRAWINGS

Embodiments of the invention will now be described with reference to the accompanying drawings, in which.

DETAILED DESCRIPTION OF EMBODIMENT(S)

In this specification, terms such as leading edge, trailing edge, pressure surface, suction surface, thickness, chord and planform are used. While these terms are well known and understood to a person skilled in the art, definitions are given below for the avoidance of doubt.

The term leading edge is used to refer to an edge of the blade which will be at the front of the blade as the blade rotates in the normal rotation direction of the wind turbine rotor.

The term trailing edge is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term spanwise is used to refer to a direction from a root end of a wind turbine blade to a tip end of the blade, or vice versa. When a wind turbine blade is mounted on a wind turbine hub, the spanwise and radial directions will be substantially the same.

A view which is perpendicular to both of the spanwise and chordwise directions is known as a planform view. This view looks along the thickness dimension of the blade.

Figure 1:
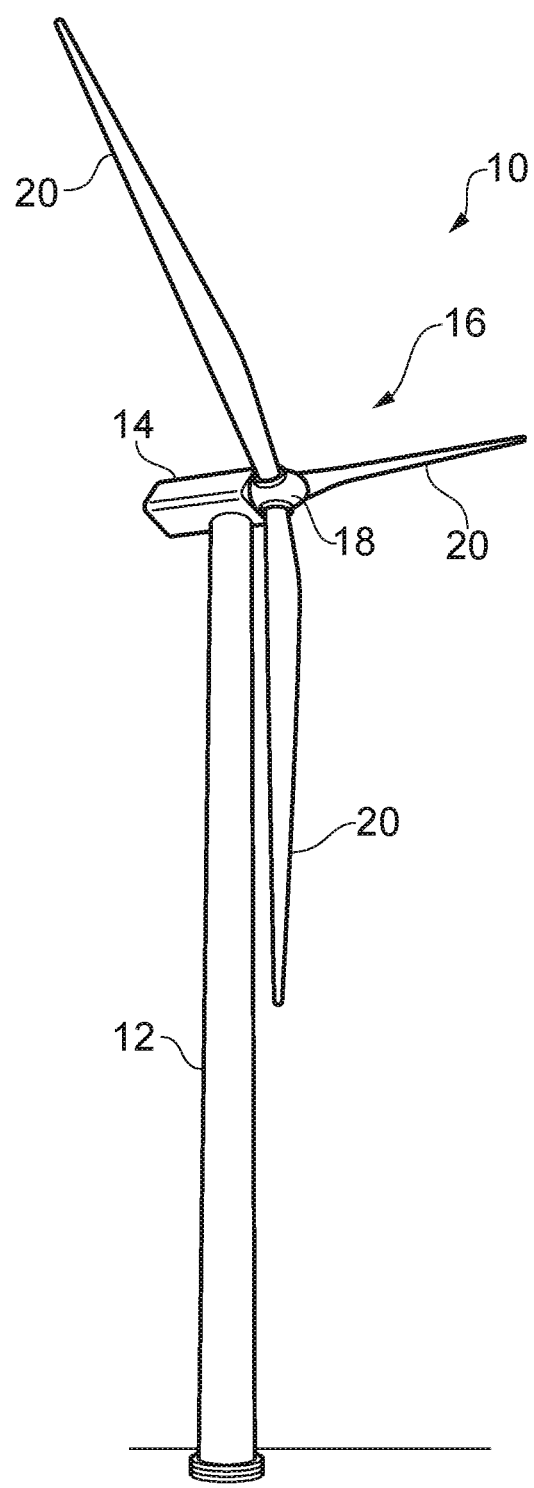
FIG. 1 shows a wind turbine.

FIG. 1 shows a wind turbine 10 including a tower 12 and a nacelle 14 disposed at the apex of the tower 12.

A rotor 16 is operatively coupled via a gearbox to a generator (not shown) housed inside the nacelle 14. The rotor 16 includes a central hub 18 and a plurality of rotor blades 20, which project outwardly from the central hub 18. While the embodiment shown in FIG. 1 has 3 blades, it will be realised by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
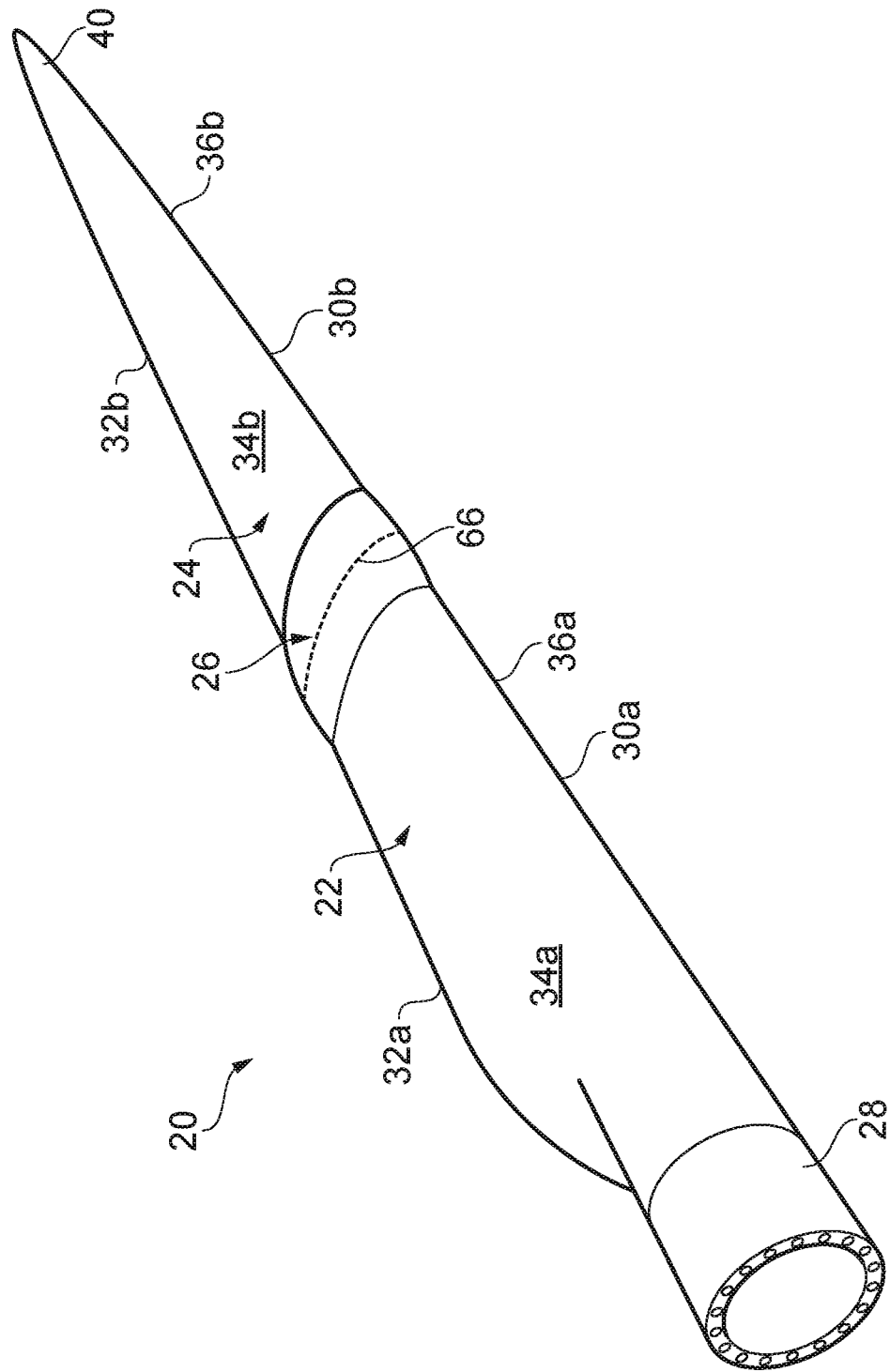
FIG. 2 shows a wind turbine blade comprising separable wind turbine blade portions.

FIG. 2 illustrates a split wind turbine blade 20 for use in such a wind turbine. The wind turbine blade 20 includes a first wind turbine blade portion 22 and a second wind turbine blade portion 24, which may be connected at a joint interface to form the blade 20.

As will be described below, each wind turbine blade portion 22, 24 may be manufactured separately and may each have all their electrical connections, e.g. for lightning strike and equipotential bonding, made at the time of manufacture. Each blade portion is then transported to a site for erection of the wind turbine. The blade portions are then joined together at the erection site to form the completed blade 20 before each blade is mounted to the hub 18 to form the rotor 16 of the wind turbine. Joining the blade portions 22, 24 together may create the required electrical connections between the blade portions.

The first blade portion 22 includes a root end 28, a leading edge 30a, a trailing edge 32a, a suction side 34a and a pressure side 36a. Similarly, the second blade portion 24 has a tip end 40, a leading edge 30b, a trailing edge 32b, a suction side 34b and a pressure side 36b. The two blade portions may be joined at a joint 26, which may be covered by a faring 66.

While the example shown in FIG. 2 has two blade portions, it will be understood that a blade may have three or more blade portions with a joint between adjacent blade portions.

While the first wind turbine blade portion 22 is showing as being nearer the root of the blade 20 and second wind turbine blade portion 24 is shown as being nearer the tip of the wind turbine blade 20, the labels "first" and "second" are not intended to be limiting and any specific property disclosed as being associated with the first or second wind turbine blade portion may be applied to the other wind turbine blade portion.

Figure 3:
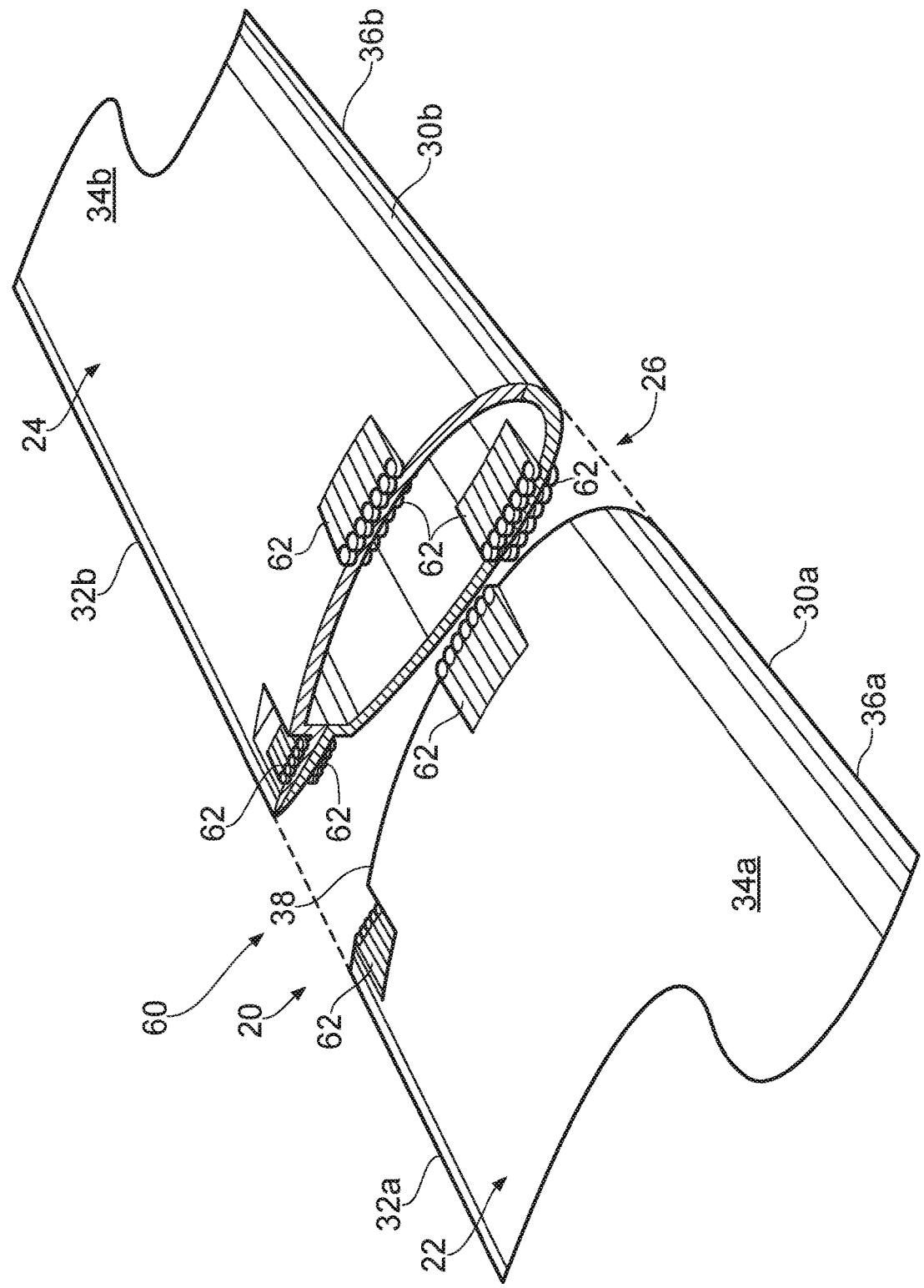
FIG. 3 shows a view of two adjacent wind turbine blade portions.

FIG. 3 shows the first and second wind turbine blade portions 22 and 24 separated at the location of the joint 26. In FIG. 3, it can be seen that the wind turbine blade portions 22, 24 may be formed from substantially hollow shells and may be arranged to be connected using attachments portions 62. The blade 20 shown in FIG. 3 has eight attachment portions, with opposing pairs of first and second attachment portions 62 disposed on the top and bottom sides of each shell and disposed in two discrete positions, one nearer to the leading edge 30a, 30b and one nearer to the trailing edge, 32a, 32b.

While the blade portions 22, 24 are each shown as being constructed from a single shell, it is also envisioned that the blade portions 22, 24 may be constructed as a shell formed of two shell halves, bonded together by an adhesive.

The attachment portions 62 shown are formed as a plurality of composite loops attached to the blade shell, having apertures therethrough in a thickness direction of the blade. However, the attachment portions could alternatively have other shapes and be made of other materials for providing anchoring of the tension members to the blade portions. The attachment portions may be embedded in the blade shell. Apertures through the attachment portions may extend through the blade shell.

Figure 4:
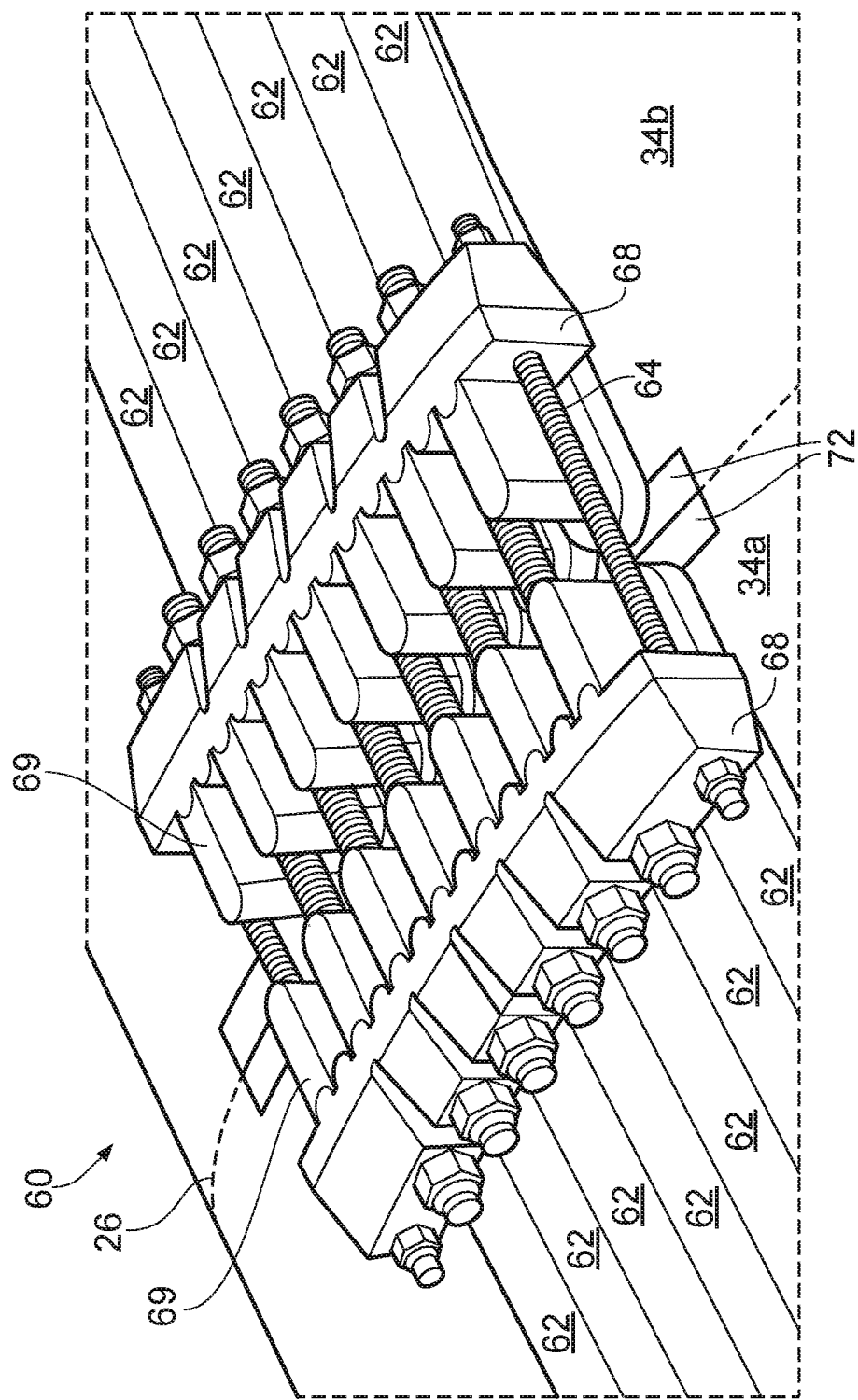
FIG. 4 shows a view from above of a joint between two adjacent wind turbine blade portions.

FIG. 4 shows a view from above of the joint 60 once the blade portions 22 and 24 have been attached. While FIG. 4 shows the joint at one region or array of the attachment portions 62, it will be understood that a similar arrangement may be used at all or any other attachment portions of the blade.

As can be seen from FIG. 4, the joint 60 comprises retention blocks 68 and connection members in the form of cross pins 69. The cross pins extend through apertures in the attachment portions 62 and the retention blocks act against the cross pins. This type of joint is described in applicant's co-pending application PCT/DK2017/050441 which is incorporated herein by reference and so will not be discussed in detail. However, in brief, the retention blocks 68 have holes through which the tension members 64 may pass. The tension members may be bolts or pins. The bolts or pins may be threaded and secured against the retention blocks 68 by nuts. When the tension members 64 are put under tension, the retention blocks 68 acts against the cross pins 69 such that the blade portions 22 and 24 are connected together at the joint.

It is also envisioned that this arrangement may be mirrored on the other side of the joint 60, such that there are tension members on both the interior and the exterior of the blade portions 22, 24.

It is also envisioned that the joint 60 may comprise a generally U-shaped clamp having a base and legs extending from the base which pass through the apertures of the attachment portions 62, and with a tension member (e.g. a bolt or pin) joining the free ends of the legs of the U-shaped clamp. Tensioning the tension member imparts a corresponding tension in the base of the U-shaped clamp. The base of the U-shaped clamp may therefore also be considered as a tension member. Such a joint configuration and others which may be used for joining blade portions is known from applicant's co-pending application PCT/DK2017/050441 which is incorporated herein by reference.

Regardless of the specific type of attachment portions and connecting members, the tension members 64 may extend across the blade joint 60, and be coupled to connecting members 68 at both ends to anchor the tension members to the blade portions.

Metallic plates 72 may be disposed between the blade portions 22 and 24. These metallic plates abut each other in compression when tension is applied to the tension members during joining of the blade portions 22 and 24. The metallic plates may also abut the blade portions 22 and 24. The metallic plates thus may provide an interface between the blade portions 22 and 24. This interface may be configured such that there is no direct abutment between adjacent attachment portions 62 of the blade portions 22 and 24. In addition, this interface may be configured such that there is direct abutment between adjacent composite parts of the blade portions 22 and 24 on either side of the metallic plates. Each of the metallic plates may define a lateral edge of its respective blade portion. The metallic plates preferably are not fixed directly to another (e.g. by fasteners). Preferably, the metallic plates are merely simply abutting in compression due to the tension in the tension members. The metallic plates may be fastened to their respective blade shell portions.

Since the tension members 64 will be in tension across the joint, when the joint is formed, there is correspondingly a compressive force between the metallic plates 72 which maintains the metallic plates 72 in abutting face contact. It is also realised that providing tension members on either side of the joint can reduce or prevent asymmetric or excessive loads from being transmitted to the blade shells. The compressive load in the metallic plates may be high, e.g. approximately 700 kN. The plates may be formed to resist creep even under high compressive load. The plates may be hydrophobic so as to resist water or sea water corrosion.

In FIG. 4, a plurality of tension members 64 are shown extending across the pair of metallic plates 72 in planform view. While eight tension members are shown, any other number of tension members could be used, including one.

In this arrangement, no tension members pass through the metallic plates 72. The tension members 64 are arranged around the metallic plates 72 so that a compressive force is generated between the plates.

Figure 5A:
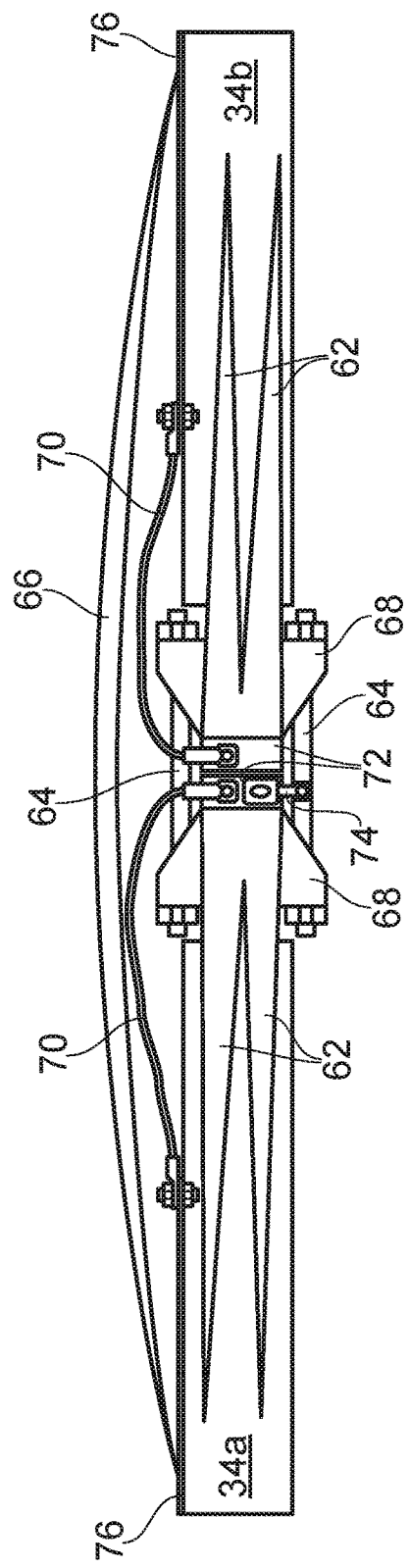
FIG. 5a shows a cross section of a first joint between two adjacent wind turbine blade portions.
Figure 5B:
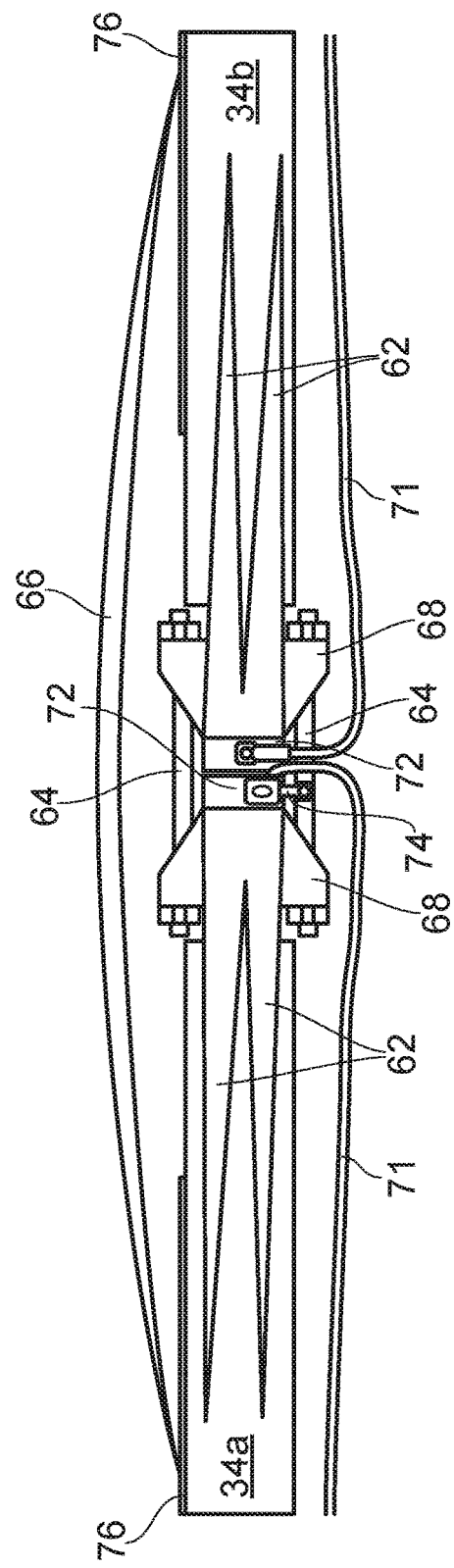
FIG. 5b shows a cross section of an alternative joint between two adjacent wind turbine portions.

FIGS. 5a and 5b show schematically the electrical connections which may be present across the joint. In FIGS. 5a and 5b, it can be seen that the metallic components of the joint may be covered by a fairing 66, which extends between the first and second blade portions 22 and 24. The fairing may be formed of an electrically insulative material in order to reduce the probability of lightning strikes hitting metallic structural components of the joint, such as the connecting members 68 and tension members 64, which would otherwise be exposed to the exterior/outer surface of the blade. Alternatively, the fairing could be electrically conductive or have an electrically conductive layer or portion, so that current from a lightning strike hitting the joint may be conducted into a lightning protection system of the blade. As is common, each blade of the wind turbine includes lightning strike protection which is electrically coupled through the wind turbine tower to ground.

On the surface of the blade portions 22, 24 may be disposed a metallic mesh 76, which forms part of a lightning strike protection system. The metallic mesh 76 may be covered with a layer of glass fibre and possibly a gel coat, or paint. Here the term 'mesh' is used to also extend to include an expanded metal foil or the like, generally termed a 'surface protection layer'. As shown in FIG. 5a, the metallic mesh 76 may be coupled to the metallic plates 72 via cables 70. Specifically, the metallic mesh portions disposed on each blade portion 22, 24 are attached by the cables 70 to the metallic plate 72 which is disposed on the same blade portion on which the metallic mesh portion is disposed.

The cables 70 may pass directly over the surface of the blade portions 22, 24, and may be covered by a fairing or the cables 70 may pass through the blade shell and travel for a distance along the interior of the blade portions 22, 24, such that the cables 70 are connected to the metallic plates 72 from the interior of the blade portions 22, 24.

When the blade portions are joined together the metallic plates abut in compression and become electrically connected such that the respective parts of the lightning strike protection system on each blade portion, i.e. the mesh, are electrically connected. This avoids any requirement for separately joining the mesh portions via additional electrical connectors at the adjacent ends blade portions during joining of the blade portions. Since the metallic plates 72 are abutting and therefore provide a current path there is no requirement to have a permanent cable coupling the portions of the lightning protection system of the respective blade portions 22 and 24.

The tension members 64 or connecting members 68 may also be electrically coupled to one of the metallic plates 72 such that the structural metallic components of the joint are equipotentially bonded to one of the plates 72. This reduces or eliminates the probability of an electrical current, e.g. from a lightning strike, passing through the structural metallic components of the joint. In the case of a threaded/bolted joint, heating of the bolts or retaining nuts may be avoided, which could otherwise cause loosening or weakening of the threaded/bolted joint.

The equipotential bonding may be achieved by use of a cable 74 coupled to one of the metal plates 72 and to a tension member 64, or by one of the metallic plates 72 being coupled to a connecting member 68. In an analogous way, the metallic plates 72 may be coupled to any metallic structural part in order to ensure equipotential bonding throughout the joint. By electrically connecting the metal plates to the metallic parts of the joint means that the electrically conductive components are equipotentially bonded; therefore, in the event of a lightning strike a flash-over can be avoided between the lightning protection system and the metal parts of the joint.

Figure 6:
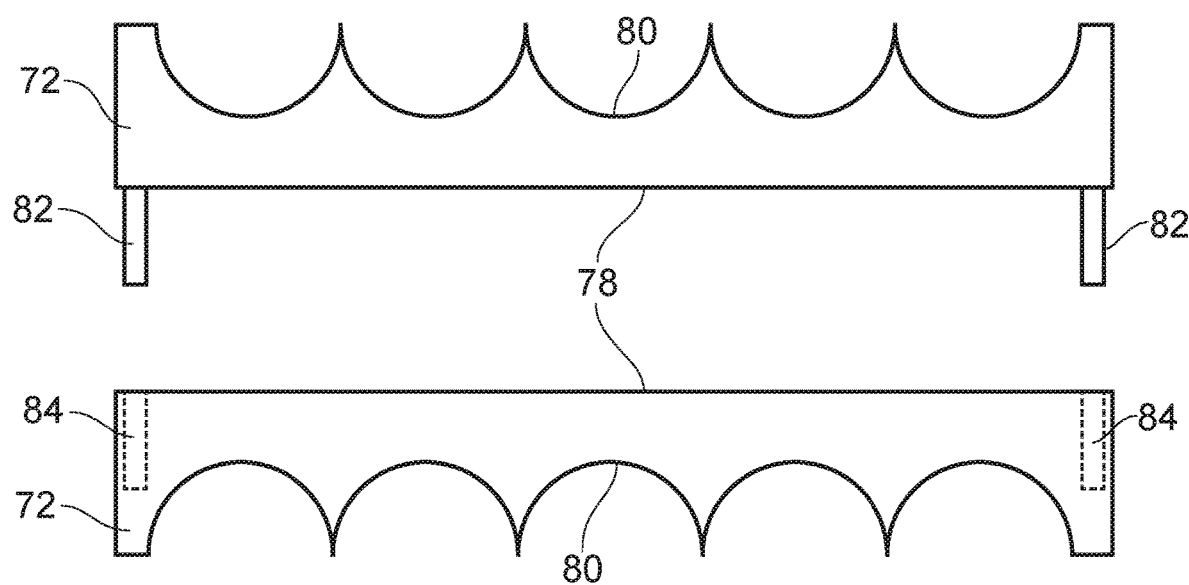
FIG. 6 shows a top view of a metallic abutting plate pair.

FIG. 6 shows a plan view of the metallic plates 72. The metallic plates 72 are shown as having planar abutting surfaces 78. In this example, the metallic plates 72 have concave reverse surfaces 80 for contacting or engaging the composite connecting loops of the attachment portions 62. The concave surfaces 80 may be shaped so at to conform to the outer side of the attachment portions so that the compressive load on the metallic plates 72 can be evenly transferred to the attachment portions 62. The shape of the reverse surfaces 80 may be different where other types of attachment portions are used. The abutting faces of the metallic plates 72 need not be planar and may be profiled with any suitable cooperating profiled shape.

The metallic plates 72 may have corresponding pins 82 and holes 84 (or any other cooperating keys) which allow the metallic plates to be located relative to each other during joining of the wind turbine blade portions together. While two pins 82 and two holes 84 are shown, it will be understood that any number of cooperating keys may be used, including one.

The pins 82 are not intended to carry any substantial load (in the spanwise or chordwise direction), but merely to provide a means for locating one metallic plate 72 relative to another. The holes 84 may be clearance holes and may therefore have a cross section which is larger than that of the pins 82.

The metallic plates 72 may have a minimum thickness of approximately 30 mm and a maximum thickness of approximately 70 mm. The thickness of the plate at any location may be selected to support the desired compressive load and/or to provide a minimum cross section for supporting a lightning discharge current passing therethrough.

As shown in FIG. 5b, the blade portions may each carry a down conductor cable portion 71 as part of a lightning strike protection system for the blade. This may be provided in addition or alternatively to the mesh or other surface protection layer. The down conductor 71 may be connected to one or more lightning receptors on the outer surface of the respective blade portion. The down conductor cable portion 71 may extend along the length of the respective blade portion, inside the blade shell. Each down conductor cable portion 71 may be electrically connected to the respective metallic plate of the blade portion. When the blade portions are joined together the metallic plates abut in compression and become electrically connected such that the down conductor cable portions 71 are electrically connected. This avoids any requirement for separately joining the down conductor cable portions via additional electrical connectors at the adjacent ends of the down conductor cable portions 71 during joining of the blade portions.

Prior to joining of the blade portions, the metallic plates may be temporarily electrically connected together with a discharge cable. This ensures that as the blade portions are brought together, any static discharge built up in either of the blade portions does not discharge across to the other metallic plate. After the metallic plates are brought into abutment the temporary discharge cable can be removed as the abutting metallic plates provide the electrical connection across the joint.

The blade portions may each comprise a reinforcing spar structure comprising carbon fibres. The spar may be embedded in the blade shell structure, or it may be a separate element which is bonded to the blade shells. The carbon fibre spar may be electrically conductive. The electrically conductive carbon fibre spar may be electrically connected to the metallic plate of the respective blade portion. The electrical connection from the carbon fibre spar to the metallic plate may be indirect via the mesh or other surface protection layer of the blade shell, or via a down conductor cable 71 inside the blade shell, for example. The carbon fibre spar may be terminated some distance back (in a spanwise direction) from the joint location, so that direct electrical connection to the respective metallic plate is not possible and indirect electrical connection, e.g. via the mesh, is required. By electrically connecting the carbon fibre spar to the metallic components of the joint and the lightning protection system means that all electrically conductive components are equipotentially bonded; therefore, in the event of a lightning strike a flash-over can be avoided between the lightning protection system and the carbon fibre spar.

A removable inspection hatch may be provided in the blade outer surface covering the tension members to permit access to the tension members. Any metallic components of the hatch or fixings for securing the hatch to the blade shell may be equipotentially bonded to one of the metallic plates. Similarly, where a fairing is provided over the joint any metallic components thereof may be equipotentially bonded to one of the metallic plates.

The metallic plates may include aluminium or an aluminium alloy or any other suitable metallic material. The plates may be formed by machining or casting for example. The plate material may be isotropic or near isotropic.

The electrical connection across the metallic plates may provide a connection for approximately 20 MJ or more. As the metallic plates are in compression with each other a reliable and secure electrical connection is provided between the plates through which lightning current can pass. In particular, as the compressive load between the metallic plates is high there will be a low electrical resistance between the plates. This means that in the event of a lightning strike there will be low heat dissipation from the plates which will enable the metallic plates to carry the lightning current safely which may be 200 kA or more. As the heat dissipation from the metallic plates is low, in the event of a lightning strike, the metallic plates will not expand (or contract) which avoids unwanted forces being transmitted to the bolted joint.

Furthermore, the metallic plates have a relatively large surface area, for example 0.1 m$^2$. This large cross section also leads to a secure electrical connection between the two blade segments as the large cross section of the electrical connection will have a lower resistance compared to a conventional cable joint.

Where the blade comprises two blade portions, the joint may be provided approximately in the mid span portion of the blade or may be provided nearer the root end or nearer the tip end of the blade. Where the blade comprises three or more blade portions the joints may be provided spaced approximately equidistantly or otherwise along the spanwise direction.

Although the invention has been described above with reference to one or more preferred embodiments, it will be appreciated that various changes or modifications may be made without departing from the scope of the invention as defined in the appended claims.

The invention claimed is:

1. A wind turbine blade assembly comprising:
   a first wind turbine blade portion having a first attachment portion and a first metallic plate,
   a second wind turbine blade portion having a second attachment portion and a second metallic plate, and
   at least one tension member for coupling to the first and second attachment portions to join the first wind turbine blade portion to the second wind turbine blade portion at a joint interface, wherein the at least one tension member is spaced a distance away from the joint interface in a thickness direction of the wind turbine blade so as to extend in a spaced arrangement over the joint interface,
   wherein the first and second metallic plates are configured to abut in compression at the joint interface due to tension in the tension member when the first wind turbine blade portion is joined to the second wind turbine blade portion with the at least one tension member, and
   wherein one of the first or second metallic plates is equipotentially bonded to any other metallic component of the joint interface between the first and second blade portions.

2. The wind turbine blade assembly of claim 1, wherein when the first wind turbine blade portion is joined to the second wind turbine blade portion with the at least one tension member, the tension member is arranged to cross the first and second metallic plates when the wind turbine blade is viewed in planform.

3. The wind turbine blade assembly of claim 1, wherein the first and second attachment portions are arranged to be coupled by at least two tension members, and the first and second metallic plates are arranged between the at least two tension members.

4. The wind turbine blade assembly of claim 3, wherein a first tension member and a second tension member are arranged spaced apart in a chordwise direction when viewed in planform.

5. The wind turbine blade assembly of claim 1, wherein the first and second blade portions each comprise a first and a second component of a lightning protection system respectively, and the first and second components are electrically coupled to the first and second metallic plates respectively.

6. The wind turbine blade assembly of claim 5, wherein the first and second components each comprise at least one of:
   a metallic mesh on the outer surface of the blade portion, and
   an electrically conductive cable extending through the blade portion.

7. The wind turbine blade assembly of claim 5, wherein the first and second components are separate components and are electrically coupleable via the first and second metallic plates.

8. The wind turbine blade assembly of claim 1, wherein the first and/or second blade portions comprise an electrically conductive carbon fibre spar extending through the blade portion, electrically coupled to at least one of the metallic plates.

9. The wind turbine blade assembly of claim 1, wherein the attachment portions each comprise at least one aperture extending through the attachment portion in a thickness direction of the wind turbine blade.

10. The wind turbine blade assembly of claim 9, further comprising at least one connection member disposed in the aperture, the connection member arranged for coupling to the at least one tension member.

11. The wind turbine blade assembly of claim 1, wherein the first and second metallic plates each have a substantially planar abutment surface.

12. The wind turbine blade assembly of claim 1, wherein the first metallic plate has at least one pin extending in a spanwise direction of the first blade portion and the second metallic plate has at least one corresponding hole for receiving the pin.

13. The wind turbine blade assembly of claim 1, wherein the first and second blade portions further comprise a plurality of first and second attachment portions respectively, and
   wherein the first attachment portions are spaced apart in a chordwise direction and the second attachment portions are spaced apart in the chordwise direction.

14. The wind turbine blade assembly of claim 1, wherein the first and second blade portions each comprise a shell, the shell formed of:
   a top side forming a suction surface of the blade, and
   a bottom side forming a pressure surface of the blade,
   wherein the top side and the bottom side each comprise first and second attachment portions, first and second metallic plates and at least one tension member.

15. A method of constructing a wind turbine blade comprising:
   providing a first blade portion having a first attachment portion and a first metallic plate,
   providing a second blade portion having a second attachment portion and a second metallic plate, joining the first and second attachment portions via a tension member at a joint interface, such that the first and second metallic plates abut in compression at the joint interface due to tension in the tension member, and equipotentially bonding one of the first or second metallic plates to any other metallic component of the joint interface between the first and second blade portions, wherein the at least one tension member is spaced a distance away from the joint interface in a thickness direction of the wind turbine blade so as to extend in a spaced arrangement over the joint interface.

16. The method of claim 15, further comprising connecting a discharge cable between the first and second metallic plates before the joining step and disconnecting the discharge cable after the metallic plates are brought to abutment by the joining step.

17. The method of claim 15, further comprising electrically coupling at least one of the metallic plates to a component of a lightning protection system.

18. The method of claim 17, wherein the component comprises at least one of:
 a metallic mesh on the outer surface of the blade portion, and
 an electrically conductive cable extending through the blade portion.

19. The method of claim 17, wherein the electrical coupling is performed before the joining of the first and second attachment portions.

20. The method of claim 15, wherein the first and/or second blade portions comprise an electrically conductive carbon fibre spar extending through the blade portion, and the method further comprises electrically coupling the electrically conductive carbon fibre spar to at least one of the metallic plates.

* * * * *